United States Patent [19]
Oshima et al.

[11] Patent Number: 5,251,068
[45] Date of Patent: Oct. 5, 1993

[54] OBJECTIVE LENS HAVING A FILTER

[75] Inventors: Shigeru Oshima, Yokohama; Yusuke Furue, Tokyo, both of Japan

[73] Assignee: Canon Kabushiki Kaisha, Tokyo, Japan

[21] Appl. No.: 2,677

[22] Filed: Jan. 8, 1993

Related U.S. Application Data

[63] Continuation of Ser. No. 691,422, Apr. 25, 1991, abandoned.

[30] Foreign Application Priority Data

Apr. 27, 1990 [JP] Japan ................................ 2-112544

[51] Int. Cl.$^5$ .................... G02B 5/22; G02B 27/14; H04N 9/097
[52] U.S. Cl. .................... 359/634; 359/637; 359/723; 359/888; 359/891; 358/55
[58] Field of Search ............... 350/173, 439, 438, 317, 350/316, 166; 358/55; 359/634, 637, 723, 722, 888, 891

[56] References Cited

U.S. PATENT DOCUMENTS

| | | | |
|---|---|---|---|
| 3,534,159 | 10/1970 | Eilenberger | 359/891 |
| 4,589,015 | 5/1986 | Nakata et al. | 350/173 |
| 4,964,696 | 10/1990 | Suzuki et al. | 359/888 |
| 5,002,347 | 3/1991 | Anderson et al. | 350/317 |

Primary Examiner—Jon W. Henry
Attorney, Agent, or Firm—Fitzpatrick, Cella, Harper & Scinto

[57] ABSTRACT

This specification discloses an objective lens disposed forwardly of a prism block for dividing light into a plurality of color components, the objective lens having an optical filter differing in spectral transmission factor between the central area thereof and the marginal areas thereof, this filter being given the characteristic that one of the marginal areas transmits much of magenta light therethrough and the other marginal area transmits much of green light therethrough, thereby suppressing the coloring of a blurred image based on the light incidence angle dependency of the color dividing surface of the prism block.

12 Claims, 5 Drawing Sheets

OBJECTIVE LENS HAVING A FILTER

This application is a continuation of application Ser. No. 07/691,422 filed Apr. 25, 1991 now abandoned.

BACKGROUND OF THE INVENTION

1. Field of the Invention

This invention relates to an objective lens, and particularly to an objective lens suitable for use in a color video camera having a prism block having dichroic film on the image side of the objective lens and dividing a light beam into a plurality of color components.

2. Related Background Art

In a three-tube type TV camera, a three-color resolving optical system comprising a plurality of prisms, color filters or the like is provided as means for color-resolving an incident light beam into a plurality of predetermined color lights between a photo-taking lens and an image pickup plate (or an image pickup tube or a solid state image pickup element).

This three-color resolving optical system is composed chiefly of a prism block comprising three to four prisms of a predetermined shape each having multilayer film, for color resolution provided on one surface thereof and combined as a unit while having a predetermined relation therebetween. The optical system is designed to resolve a light beam incident from the photo-taking lens into color lights of plural wavelength bands through the reflecting surfaces for color resolution of the prisms and direct the color lights to respective image pickup plates.

FIG. 9 of the accompanying drawings is a schematic view of a prior-art three-color resolving optical system comprising three prisms. In FIG. 9, the reference numeral 91 designates a photo-taking lens, the reference numeral 92 denotes a blue resolving prism, and the reference numeral 93 designates a red resolving prism having its entrance surface 93b disposed with a minute gap with respect to the blue resolving prism 92. The reference numeral 94 denotes a green resolving prism having its entrance surface 94a adhesively secured to the reflecting surface 93a of the red resolving prism 93.

In FIG. 9, of a light beam passed through the photo-taking lens 91, blue light B is separated by the light dividing surface 92a of the blue resolving prism 92, which is coated with dichroic film, and is totally reflected by the entrance surface 92b of the blue resolving prism 92, whereafter it emerges from the exit surface 92c of the blue resolving prism. Red color R is separated by the light dividing surface 93a of the red resolving prism 93, which is coated with dichroic film, and is totally reflected by the entrance surface 93b of the red resolving prism, whereafter it emerges from the exit surface 93c of the red resolving prism. The remaining green light G, than the blue and red components passes through the green resolving prism 94 and emerges from the exit surface 94c of this prism. The blue light B, the red light R and the green light G, thus, total three light beams, and are directed to image pickup plates, not shown.

In the prior-art three-color resolving optical system shown in FIG. 9, when light beams U (dot-and-dash line), C (solid line) and L (dotted line) passes through the central portion and marginal portion of the photo-taking lens as shown enter the blue dichroic film provided on the light dividing surface 92a of the blue resolving prism 92 and the red dichroic film provided on the light dividing surface 93a of the red resolving prism 93, which prisms are positioned in the course of the arrival of the light beams at the respective image pickup plates, not shown, there are created differences among the angles of incidence of the light beams U, C and L. Therefore, the spectral transmission characteristics for the light beams U, C and L become different from one another as shown, for example, in FIG. 10 of the accompanying drawings. Respective lines in FIG. 10 correspond to respective lines in FIG. 9. In FIG. 10, the abscissa represents wavelength.

Therefore, when the color reproduction of a color image is effected in an in-focus state (a position Y indicated in FIG. 9), no color misregistration occurs to the object image, but when the color reproduction of a color image is effected, for example, in a state in which the object is deep and is out of focus (positions x and z indicated in FIG. 9), a blurred image gradually becomes colored in the vertical direction thereof.

Assuming that the image pickup surface lies at the position Y, when the coloring of the blurred image at this time is watched on a color monitor, the blurred image on the image pickup surface Y, when the position x is the image point, will appear as magenta in the upper portion thereof and as green in the lower portion thereof, as shown in FIG. 11 of the accompanying drawings. Also, the blurred image on the image pickup surface Y when the position Z is the image point will conversely appear as green in the upper portion thereof and as magenta in the lower portion thereof, as shown in FIG. 12 of the accompanying drawings. Thus, there has been problems in that the quality of the image, when a color image which is out of focus is represented, becomes greatly deteriorated.

SUMMARY OF THE INVENTION

It is a first object of the present invention to provide an optical device which can suppress the coloring of a blurred image and obtain a good quality image.

It is a second object of the present invention to provide a photo-taking lens having an optical unit of suitable spectral transmission characteristic for a TV camera, a video camera or the like.

DETAILED DESCRIPTION OF THE PREFERRED EMBODIMENTS

Figure 1:
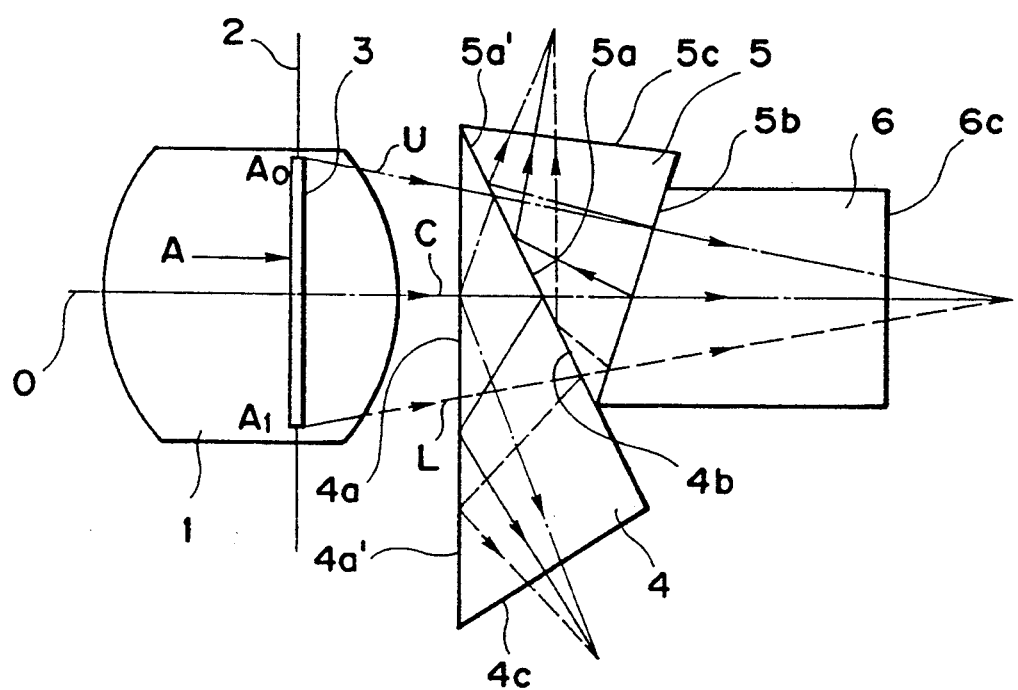
FIGS. 1 and 4 are schematic views showing the essential portions of photo-taking lenses according to first and second embodiments, respectively, of the present invention.

FIG. 1 is a schematic view showing the essential portions of an optical device having a filter having a predetermined spectral transmission factor according to a first embodiment of the present invention.

In FIG. 1, the reference numeral 1 designates an objective lens having a plurality of lenses and endowed with the zooming function. The objective lens 1 has a stop 2 at a predetermined position therein. The reference character 0 denotes the optic axis of the objective lens.

The reference numeral 3 designates a color filter according to the present invention. The color filter 3 is disposed near the position of the stop 2 (the pupil position), and partially has a spectral transmission factor to correct the coloring of a blurred image based on the incidence angle dependency of a light beam entering a prism block which will be described later.

The reference numeral 4 denotes a blue resolving prism, and the reference character 4b designates the light dividing surface (the reflecting or transmitting surface) thereof. The light dividing surface 4b is coated with blue dichroic film to effect color resolution, and separates and reflects a light beam of blue component.

The reference numeral 5 denotes a red resolving prism disposed with a slight air space with respect to the blue resolving prism. The reference character 5b designates the light dividing surface (the reflecting or transmitting surface) of the red resolving prism 5. The light dividing surface 5b is coated with red dichroic film to effect color resolution, and separates and reflects a light beam of red component.

The reference numeral 6 denotes a prism adhesively secured to the light dividing surface 5b of the red resolving prism 5.

Figure 2:
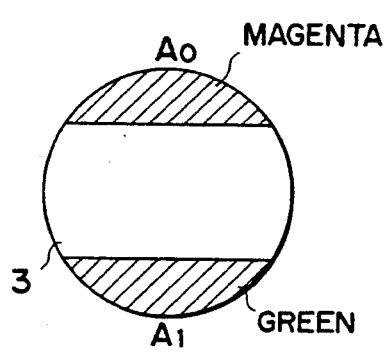
FIG. 2 is a view of the color filter in FIG. 1 taken along arrow A in FIG. 1.

FIG. 2 is a front view of the color filter 3 according to the present invention as it is seen in the direction of arrow A in FIG. 1.

Figure 3:
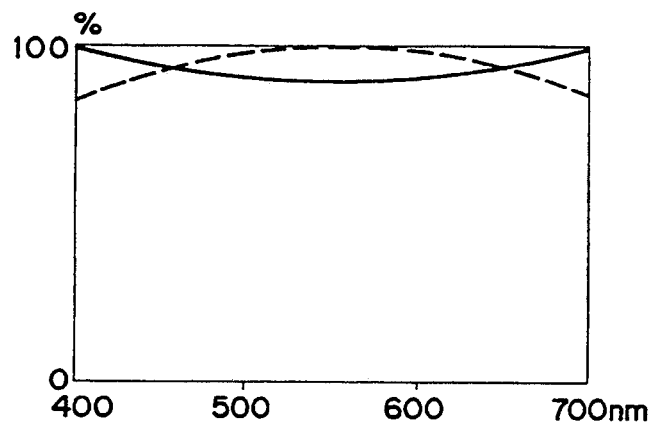
FIG. 3 is a graph illustrating the spectral transmission characteristic of the color filter shown in FIG. 1.

The color filter 3 of the present embodiment has the characteristic that the spectral transmission factor of the A0 side marginal portion (the upper hatched portion as viewed in FIG. 2) is set as indicated by a solid line in FIG. 3 to compensate for the incidence angle dependency of a light beam entering the prism block at various angles so as to transmit much of magenta light and the spectral transmission factor of the A1 side marginal portion (the lower hatched portion as viewed in FIG. 2) is set as indicated by a dotted line in FIG. 3 so as to transmit much of green light.

In the present embodiment, by such a construction, the light beams from an object, not shown, are caused to enter the entrance surface 4a of the blue resolving prism 4 in such a manner that the A0 side of the marginal portion which is on the same side as the direction in which red light is imaged transmits much magenta light by the color filter disposed near the position of the stop 2 in the objective lens 1 and the A1 side of the marginal portion which is opposite to said direction transmits much of green light.

Of the incident light beams, the light beam of a blue wavelength band is reflected by the light dividing surface 4b coated with the blue dichroic film, whereafter it is totally reflected by a reflecting surface 4a' on the same plane as the entrance surface 4a of the blue resolving prism 4 so as to emerge from the exit surface 4c of the prism 4, and is directed to an image pickup plate for blue, not shown.

Also, the light beams other than the light beam of blue component transmitted through the light dividing surface 4b of the blue resolving prism 4 enter the entrance surface 5a of the red resolving prism 5, and of the incident light beams, the light beam of red wavelength band is reflected by the light dividing surface 5b coated with the red dichroic film, whereafter it is totally reflected by a reflecting surface 5a' on the same plane as the entrance surface 5a of the red resolving prism 5 so as to emerge from the exit surface 5c of the prism 5, and is directed to an image pickup plate for red, not shown.

On the other hand, the light beam of green component transmitted through the light dividing surface 5b of the red resolving prism 5 passes through the prism 6, emerges from the exit surface 6c of the prism 6 and is directed to an image pickup plate for green, not shown. The object images are formed on the surfaces of the predetermined image pickup plates so as to obtain image information, thereby representing a good color image.

Figure 9:
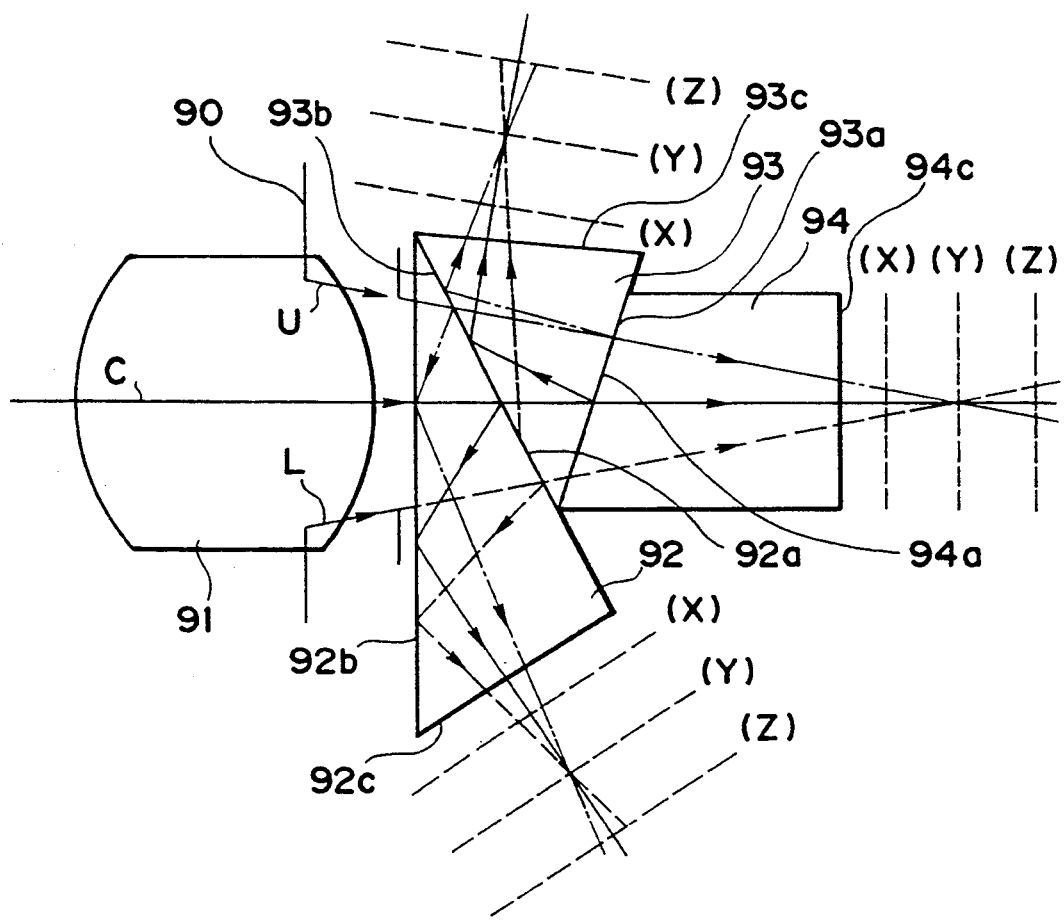
FIG. 9 is a schematic view showing the essential portions of a color resolving optical system according to the prior art.
Figure 10:
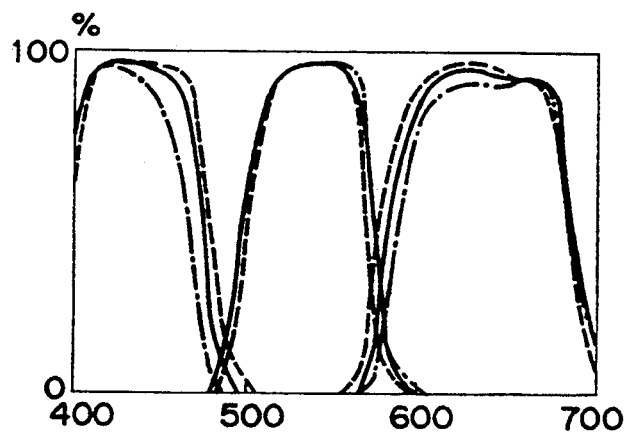
FIG. 10 illustrates the spectral transmission characteristics of light beams which cause the coloring of a blurred image in the prior art.
Figure 11:
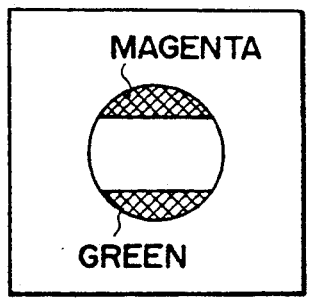
FIGS. 11 and 12 illustrate blurred images on a color monitor according to the prior art.
Figure 12:
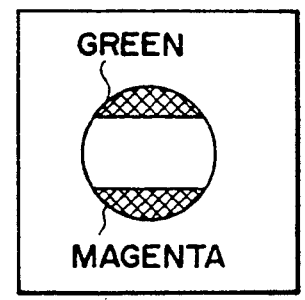

Also, even in a state in which the object is deep and is out of focus at this time (the positions X and Z indicated in FIG. 9), the color filter having the spectral transmission factor shown in FIG. 3 is disposed near the position f the stop in the objective lens, whereby a good color image can be obtained without any color misregistration being created in a blurred image when the color image is color-reproduced.

If filters in the form of very thin sheets are stuck to the upper and lower portions of the vicinity of the stop, the color filter can be easily realized.

Also, the present invention is equally applicable even if a dye is thinly applied to the surface of a glass plate as another filter.

Figure 4:
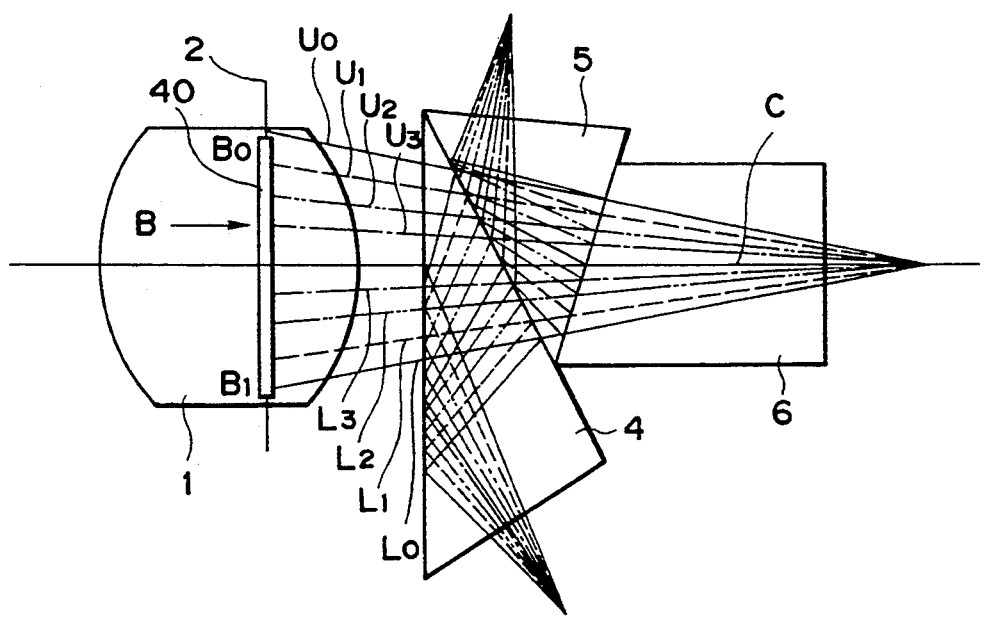

FIG. 4 is a schematic view showing the essential portions of a photo-taking lens having a filter having a predetermined spectral transmission factor according to a second embodiment of the present invention.

In FIG. 4, elements identical to those shown in FIG. 1 are given identical reference numerals. The reference numeral 40 designates a color filter. The optical density, i.e., the transmission factor, of this color filter 40 is controlled so as to be stepwisely higher, that is, higher in the transmission factor for the subject color light, from the central portion of the color filter 40 toward the marginal portion (the B0 and B1 sides) thereof.

Figure 5:
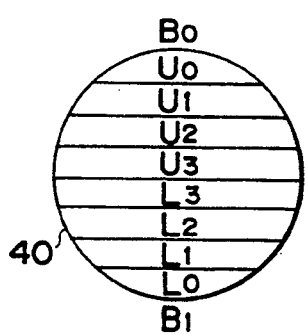
FIG. 5 is a view of the color filter in FIG. 4 taken along arrow B in FIG. 4.

FIG. 5 is a front view of the color filter 40 as it is seen in the direction of arrow B in FIG. 4.

Figure 6:
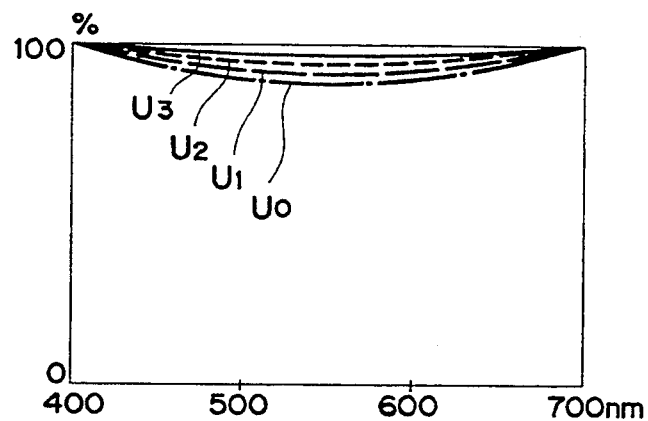
FIGS. 6 and 7 are graphs illustrating the spectral transmission characteristic of the color filter shown in FIG. 4.
Figure 7:
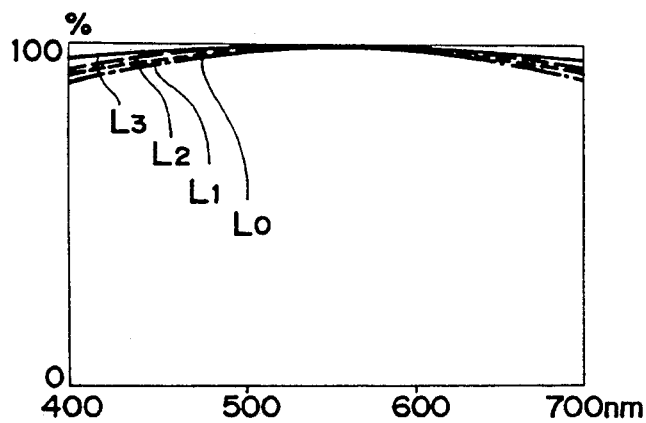

The spectral transmission factors of the portions U3, U2, U1 and U0 of the color filter 40 of FIG. 5 from the central portion thereof toward the B0 side of the marginal portion are shown in FIG. 6. Also the spectral transmission factors of the portions L3, L2, L1 and L0 of the color filter 40 from the central portion thereof toward the B1 side of the marginal portion are shown in FIG. 7.

In the present embodiment, the color filter 40 thus constructed is disposed near the position of the stop 2 in the objective lens 1 as previously described, whereby the light beam from an object, not shown, has much of its magenta light stepwisely transmitted through the color filter 40 from the central portion thereof toward the B0 side of the marginal portion thereof and has much of its green light stepwisely transmitted through the color filter 40 from the central portion thereof toward the B1 side of the marginal portion thereof.

Thereby, even in an out-of-focus state, the color misregistration of a blurred image when a color image is color-reproduced can be prevented better than in the first embodiment shown in FIG. 1, whereby a good color image is obtained.

Figure 8:
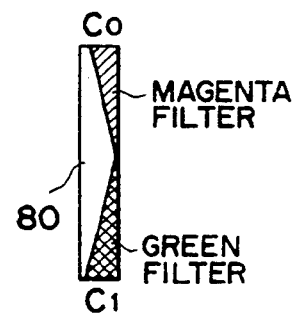
FIG. 8 is a view of a color filter according to a third embodiment of the present invention.

FIG. 8 is a front view of a color filter according to a third embodiment of the present invention as it is seen in the direction B when it is disposed at the position of the stop shown in FIG. 4.

The color filter 80 in this embodiment is of the so-called gradient type in which the spectral characteristic of the color filter 80 continuously differs among the various portions thereof.

The density of this color filter 80 is controlled so as to be continuously higher that is, higher in the transmission factor for the subject color light, from the central portion thereof toward the marginal portion thereof (the C0 and C1 sides).

The color filter 80 thus constructed is disposed near the position of the stop in the objective lens 1 as in the aforedescribed embodiments, whereby the light beam from the object is controlled so that much of magenta light may be continuously transmitted through the color filter 80 from the central portion thereof toward the C0 side of the marginal portion thereof and much of green light may be continuously transmitted through the color filter 80 from the central portion thereof toward the C1 side of the marginal portion thereof.

Thereby, when even in an out-of-focus state, a color image is color-reproduced, there can be obtained the effect that the color misregistration of a blurred image can hardly be recognized.

As a method of making the color filter of the present embodiment, for example, a glass plate, a magenta filter and a green filter are stuck to one another in a wedge-like fashion and polished and shaped into a parallel flat plate.

As described above, according to the present invention, when the light beam from the objective lens is to be resolved into a plurality of color lights of different wavelength bands through a plurality of prisms and object images are to be formed on image pickup plates for respective color resolving systems, spectral characteristic control means whose spectral transmission factor is partly controlled, for example, a color filter or the like, is disposed near the position of the stop in the objective lens, whereby there can be achieved a phototaking lens having spectral characteristic control means suitable, for example, for a TV camera, a video camera or the like which can improve the quality of the image without creating any color misregistration when a color image is color-reproduced even in an out-of-focus state.

What is claimed is:

1. An objective lens unit disposed forwardly of a prism block for dividing light into a plurality of light components, said objective lens unit comprising:
    optical conveying means for conveying light beams from an object along an optical light path; and
    an optical unit disposed in the optical light path and differing in the transmission factor for a wavelength depending on the areas of said optical unit.

2. An objective lens unit according to claim 1, further having a stop and wherein said optical unit is positioned near said stop.

3. An objective lens unit according to claim 1, wherein said optical unit is more deeply colored in the peripheral area thereof than in the central area thereof.

4. An objective lens unit according to claim 3, wherein said transmission factor varies by small amounts.

5. An objective lens unit according to claim 3, wherein said optical unit has a predetermined transmission factor characteristic in an area thereof located in a predetermined direction away from the optic axis of said objective lens unit, and has another transmission factor characteristic in an area there located in the direction opposite to said predetermined direction and away from the optic axis of said objective lens unit.

6. An objective lens according to claim 5, wherein the area located in said predetermined direction away from the optic axis of said objective lens unit has a magenta-like color, and the area far in the opposite direction has a green-like color.

7. A photographing system including:
    an objective lens unit comprising both:
        optical conveying means for conveying light beams from an object along an optical light path; and
        an optical filter differing in the transmission factor for wavelength depending on the areas thereof and disposed in the optical light path; and
    a prism block positioned adjacent to the image plane side of said objective lens unit and having dichroic film and dividing light emerging from said objective lens unit into a plurality of color components.

8. A photographing system according to claim 7, further having a stop and wherein said optical filter is positioned near said stop.

9. A photographing system according to claim 7, wherein said optical filter is more deeply colored in the peripheral area thereof than in the central area thereof.

10. A photographing system according to claim 9, wherein said transmission factor varies by small amounts.

11. A photographing system according to claim 9, wherein said optical filter has a predetermined transmission factor characteristic in an area thereof located in a predetermined direction away from the optic axis of said object lens unit, and has another transmission factor characteristic in an area thereof located in the direction opposite to said predetermined direction and away from the optic axis of said objective lens unit.

12. A photographing system according to claim 11, wherein the area located in said predetermined direction away from the optic axis of said objective lens unit has a magenta-like color, and the area far in the opposite direction has a green-like color.

* * * * *

UNITED STATES PATENT AND TRADEMARK OFFICE
CERTIFICATE OF CORRECTION

PATENT NO. : 5,251,068
DATED : October 5, 1993
INVENTOR(S) : OSHIMA, ET AL.

It is certified that error appears in the above-indentified patent and that said Letters Patent is hereby corrected as shown below:

COLUMN 2:

Line 32, "has" should read --have--.

COLUMN 3:

Line 5 , "of" should be deleted; and
   Line 62, "of" should be deleted.

COLUMN 4:

Line 27, "f" should read --of--.

COLUMN 6:

Line 21, "lens" should read --lens unit--; and
   Line 50, "object" should read --objective--.

Signed and Sealed this

Seventh Day of June, 1994

Attest:

BRUCE LEHMAN

Attesting Officer     Commissioner of Patents and Trademarks